(12) United States Patent
Lin et al.

(10) Patent No.: US 7,980,284 B2
(45) Date of Patent: Jul. 19, 2011

(54) VACUUM LAMINATOR

(75) Inventors: Dong-Sheng Lin, Taipei Hsien (TW); Tzyy-Chyi Tsai, Taipei Hsien (TW); Zhi-Bin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/548,634

(22) Filed: Aug. 27, 2009

(65) Prior Publication Data
US 2010/0243171 A1    Sep. 30, 2010

(30) Foreign Application Priority Data

Mar. 26, 2009   (CN) .......................... 2009 1 0301156

(51) Int. Cl.
*H05K 13/00*   (2006.01)
*H05K 13/02*   (2006.01)

(52) U.S. Cl. .......................... 156/382; 156/538; 700/302
(58) Field of Classification Search ................... 156/382
See application file for complete search history.

(56) References Cited

U.S. PATENT DOCUMENTS

| 2003/0205333 A1* | 11/2003 | Hayafuji et al. ............. 156/580 |
| 2005/0235489 A1* | 10/2005 | Okuda et al. .................... 29/832 |
| 2009/0065120 A1* | 3/2009 | Ueno et al. ...................... 156/64 |

FOREIGN PATENT DOCUMENTS
KR    2001019020 A  *   3/2001
* cited by examiner

*Primary Examiner* — Philip C Tucker
*Assistant Examiner* — Vicki Wu
(74) *Attorney, Agent, or Firm* — Frank R. Niranjan

(57) ABSTRACT

An vacuum laminator for laminating workpieces includes a grasping assembly, an alignment assembly, a pickup head, and a sealed body. The grasping assembly is configured for grasping one workpiece. The alignment assembly is connected to the grasping assembly for adjusting a position of the workpiece on the grasping assembly. The pickup head is configured for picking up another workpiece. The grasping assembly and pickup head are received in the sealed body opposite to each other. The grasping assembly includes two grasping members grasping and releasing the workpiece.

16 Claims, 4 Drawing Sheets

VACUUM LAMINATOR

BACKGROUND

1. Technical Field

The present disclosure relates generally to panel fabrication and, more particularly, to a vacuum laminator used in display panel fabrication.

2. Description of Related Art

During fabrication of a liquid crystal display panel, two glass sheets are attached. The process is implemented in a vacuum, to prevent air bubbles forming between the sheets.

A typical vacuum laminator includes a sealed body, a first grasping member, a second grasping member, an adjusting assembly, and an alignment assembly. The first and second grasping members are positioned in the sealed body. The sealed body sustains a low air pressure. The adjusting assembly positions the first grasping member. The alignment assembly aligns the second grasping member to the first grasping member. In the laminating process, the first grasping member grasps a first glass sheet, and is driven to a predetermined position by the adjusting assembly. The second grasping member grasps a second glass sheet and is aligned with the first grasping member via the alignment assembly. The glass sheets are then attached.

The glass sheets are generally grasped by the first grasping member and the second grasping member via electrostatic adsorption or vacuum adsorption. However, glass plates for a display may have a printed circuit board (PCB) therein, which may be damaged by static electricity during the electrostatic adsorption. Furthermore, the glass plates cannot be grasped as firmly as desired during vacuum adsorption due to the low air pressure environment.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
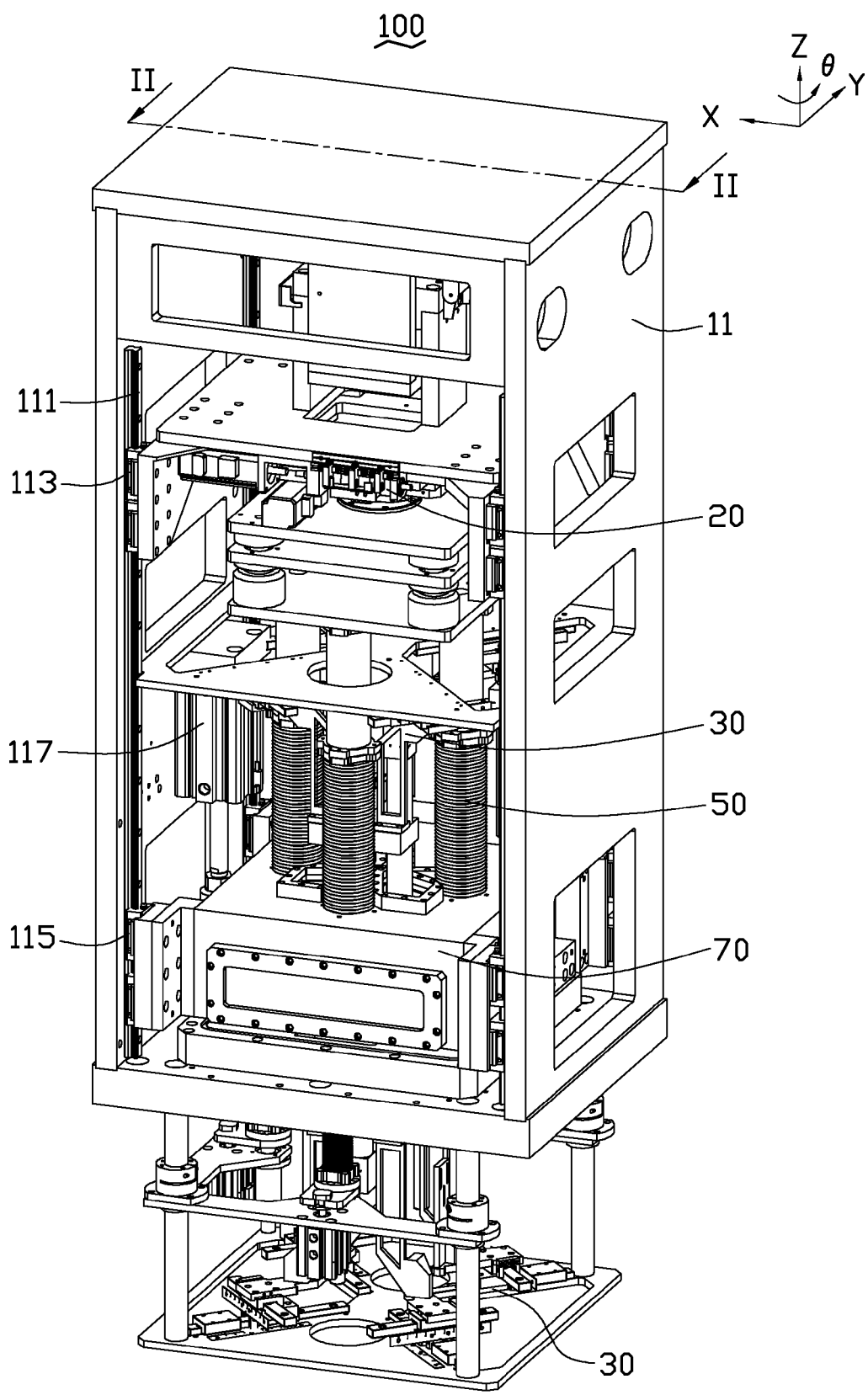
FIG. 1 is an isometric view of an embodiment of a vacuum laminator including a grasping assembly and two imaging units.
Figure 2:
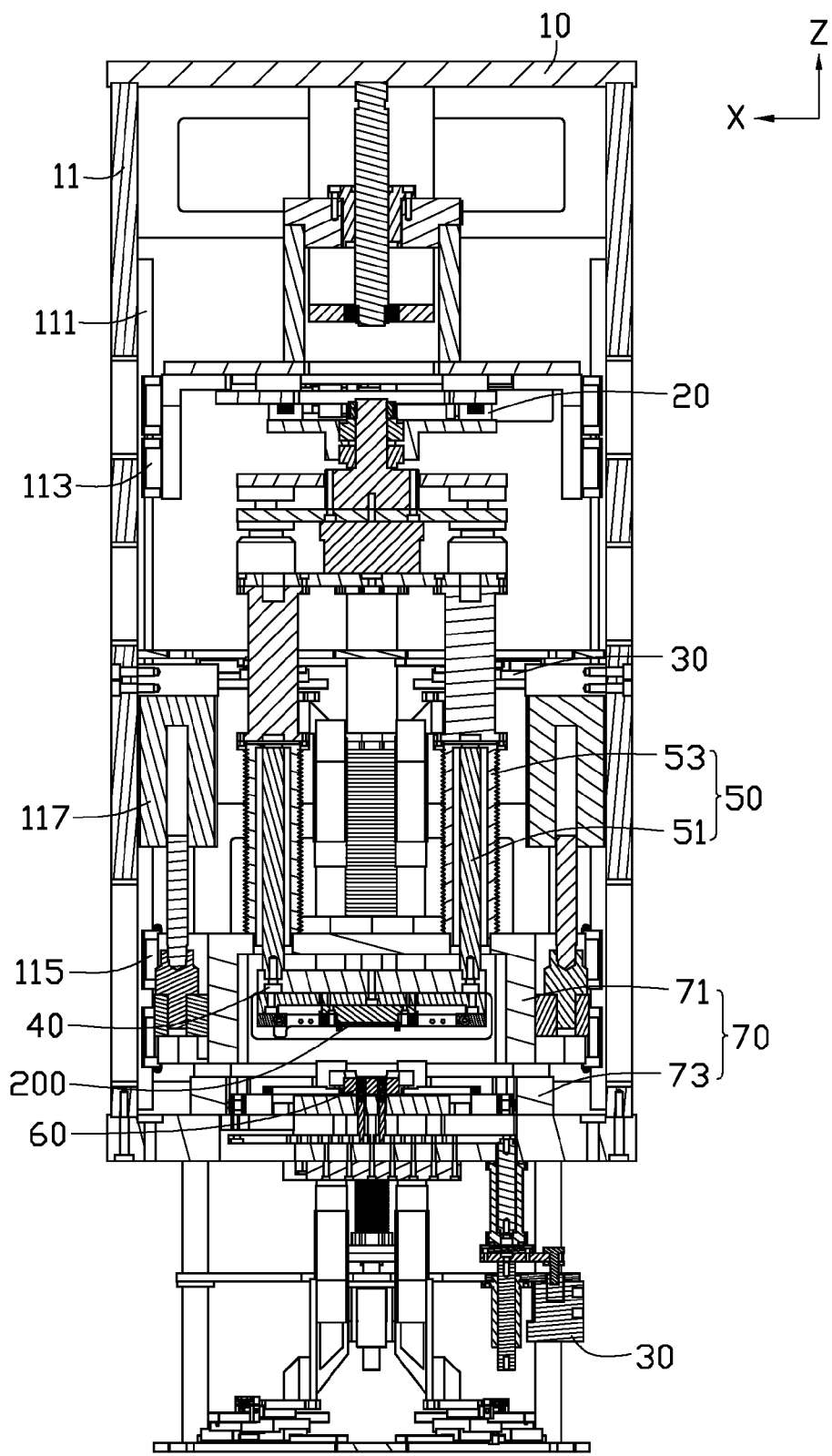
FIG. 2 is a cross-section of the vacuum laminator of FIG. 1 taken along line II-II.

Referring to FIGS. 1 and 2, an embodiment of a vacuum laminator 100 includes a housing 10, an alignment assembly 20, two imaging units 30, a grasping assembly 40, a guiding assembly 50, a pickup head 60, and a sealed body 70. The grasping assembly 40 and the pickup head 60 are positioned in the sealed body 70. The vacuum laminator laminates workpieces 200, which are shown in the illustrated embodiment as glass plates.

The housing 10 is substantially cubic, and includes two opposite sidewalls 11. A pair of sliding rails 111 is positioned on each sidewall 11 parallel to the Z-axis. A first sliding member 113 and a second sliding member 115 are slidably positioned on the sliding rails 111 of each sidewall 11. A driving device 117 is positioned on each sidewall 11 between the first sliding member 113 and the second sliding member 115. In the illustrated embodiment, the driving device 117 is substantially cylindrical.

The alignment assembly 20 is connected to the first sliding members 113 of the housing 10. The alignment assembly 20 can move parallel to the X-axis and the Y-axis, and rotate in a direction θ indicated in FIG. 1.

Figure 3:
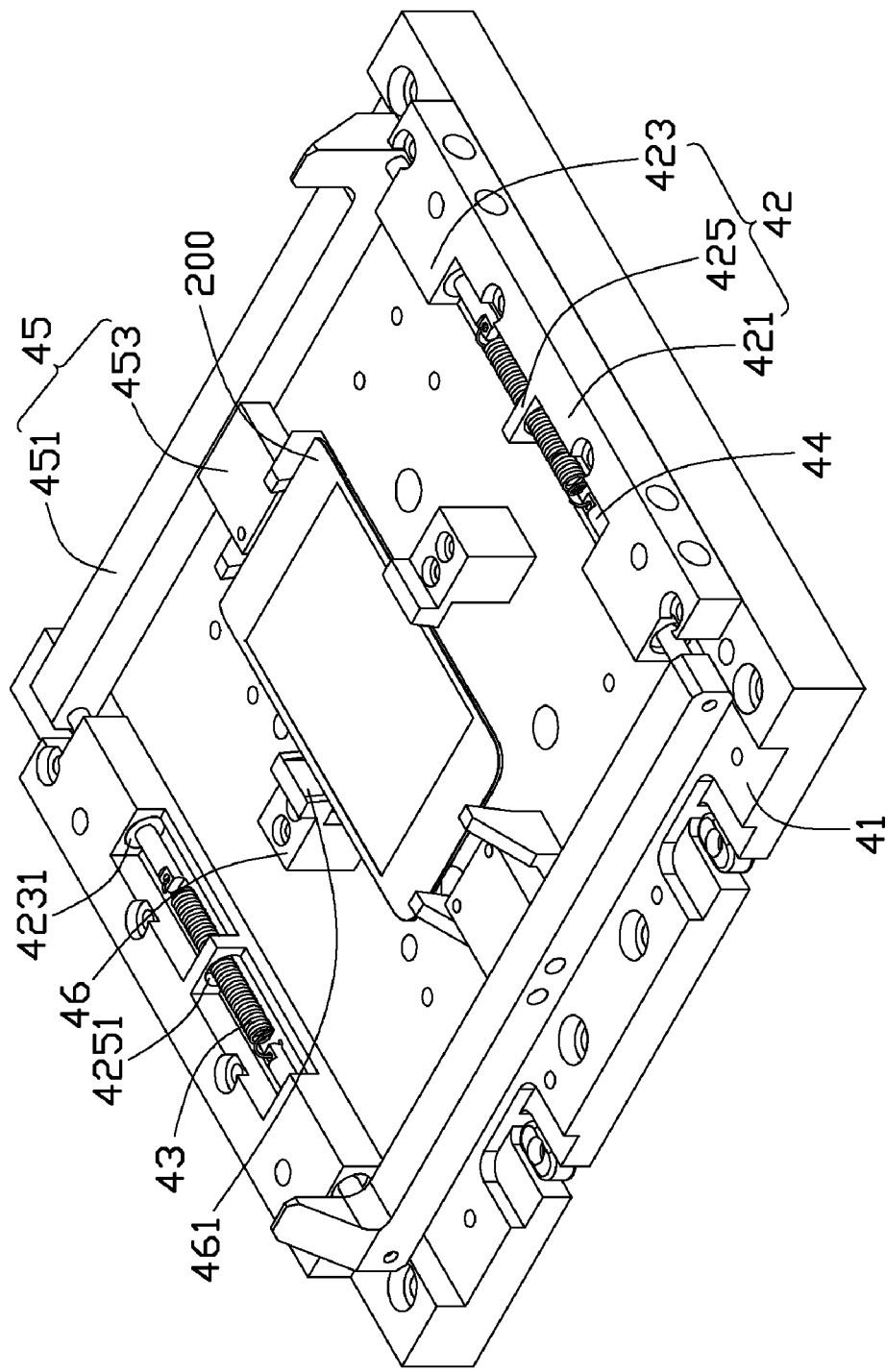
FIG. 3 is an assembled, isometric view of the grasping assembly of FIG. 1, grasping a workpiece.

Referring to FIGS. 2 and 3, the grasping assembly 40 includes a base 41, two guide members 42, two elastic members 43, four fixing posts 44, two grasping members 45, and two positioning members 46. The guide members 42 are fixed on opposite sides of the base 41 respectively. Each elastic member 43 is connected to two fixing posts 44, and extends through one guide member 42. The grasping members 45 are connected to the fixing posts 44, and positioned on opposite ends of the base 41. The positioning members 46 are fixed on a middle portion of the base 41, opposite to each other.

The base 41 is substantially rectangular in this embodiment, and connected to the guiding assembly 50.

The guide members 42 include a main body 421. Two guide portions 423 and a restricting piece 425 extend from a side of the main body 421, with the restricting piece 425 between the guide portions 423. Each guide portion 423 defines a connecting hole 4231 for receiving the fixing post 44. The restricting piece 425 defines a restricting hole 4251 for receiving the elastic members 43. The elastic members 43 are compression springs in this embodiment. The fixing posts 44 extend partially out of the guide portions 423.

Each grasping member 45 includes a sliding portion 451 and a grasping portion 453 connected substantially perpendicular to the sliding portion 451. The grasping members 45 and the guide members 42 cooperatively form a rectangle. Each positioning member 46 has a positioning surface 461.

The guiding assembly 50 includes one or more guiding posts 51 and one or more bellows 53. In the illustrated embodiment, the guiding assembly 50 includes three guiding posts 51 and three bellows 53. The guiding posts 51 connect the alignment assembly 20 to the grasping assembly 40. The bellows 53 are sleeved on the guiding posts 51.

The pickup head 60 is opposite the grasping assembly 40, and configured for grasping the workpieces 200.

The sealed body 70 is substantially cubic in this embodiment. The sealed body 70 includes a main portion 71 and a cover plate 73 engaging with the main portion 71. The pickup head 60 is fixed on the cover plate 73. The sealed body 70 connects the second sliding members 115, and is moved by the driving devices 117.

Figure 4:
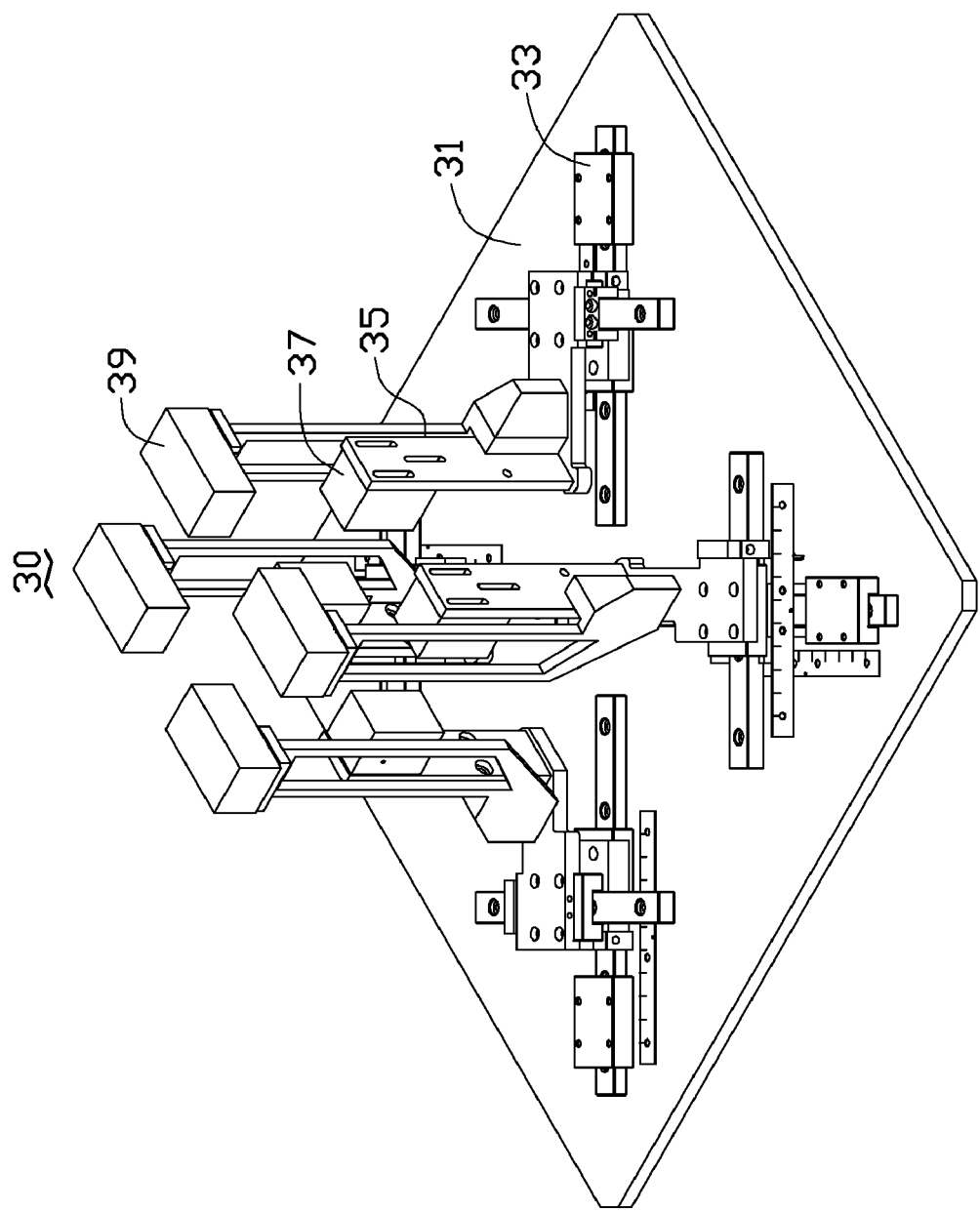
FIG. 4 is an assembled, isometric view of one imaging unit of FIG. 1.

Referring to FIGS. 2 and 4, the imaging units 30 are disposed on opposite ends of the sealed body 70. In the illustrated embodiment, one imaging unit 30 is disposed between the alignment assembly 20 and the grasping assembly 40, and the other imaging unit 30 is disposed below the sealed body 70. Each imaging unit 30 includes a positioning plate 31, a plurality of guide rails 33, a plurality of frames 35, a plurality of imaging members 37, and a plurality of light sources 39. The guide rails 33 are fixed on the positioning plate 31. The frames 35 are slidably disposed on the guide rails 33. The imaging members 37 and the light sources 39 are fixed on the frame 35.

Referring to FIGS. 1 through 4, during assembly of the vacuum laminator 100, an end of the alignment assembly 20 is connected to a driving device (not shown), and the other end of the alignment assembly 20 is connected to guiding posts 51. The positioning plate 31 of one imaging unit 30 is fixed to the sidewalls 11 of the housing 10. The guiding posts 51 extend through the imaging units 30 into the sealed body 70. The grasping assembly 40 is connected to the guiding posts 51. Another imaging unit 30 is fixed on the cover plate 73 of the sealed body 70.

In use, the main portion 71 of the sealed body 70 is moved parallel to the Z-axis by the driving device 117, and the bellows 53 are compressed. Thus, the main portion 71 is separated from the cover plate 73. The grasping members 45 are moved apart by a cylinder (not shown), and the elastic members 43 are deformed. A workpiece 200 is disposed on the base 41 between the positioning members 46. A driving force of the cylinder is released, and the grasping members 45 move towards the workpiece 200 driven by the elastic members 43, until the grasping portions 453 contact the workpiece 200. Another workpiece 200 is grasped by the pickup head 60.

The main portion 71 is moved towards the cover plate 73 by the driving device 117, and engages the cover plate 73 again to form a sealed space (not labeled). Air pressure in the sealed space is gradually reduced by a decompressor (not shown).

The two workpieces 200 are photographed by the imaging units 30, with a resulting imaging signal sent to a controller (not shown). The controller directs the alignment assembly 20 to adjust a position of the workpiece 200 on the grasping assembly 40, until the workpiece 200 on the grasping assembly 40 is aligned with the workpiece 200 on the pickup head 60. The workpieces 200 are attached.

The vacuum laminator grasps the workpieces 200 via the grasping assembly 40, thus avoiding damage caused by static electricity. The workpieces 200 are firmly positioned by the grasping assembly 40 throughout the laminating process.

In addition, a position of each imaging member 37 of the imaging unit 30 can be adjusted, because the frame 35 is slidably positioned on the guide rail 33. Thus, the positions of the workpieces 200 can be accurately recorded.

It should be pointed out that the grasping assembly 40 may include four or more grasping members 45 opposite to each other. A shape of the grasping portion may be changed according to a shape of the workpieces 200. The fixing posts 44 of the grasping assembly 40 may be omitted, and the grasping members 45 directly connected to the elastic members 43. In addition, the vacuum laminator 100 may include one or more than two imaging units 30.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A vacuum laminator for laminating workpieces, comprising:
   a grasping assembly grasping one workpiece;
   an alignment assembly connected to the grasping assembly adjusting a position of the workpiece on the grasping assembly;
   a pickup head picking up another workpiece; and
   a sealed body, wherein the grasping assembly and the pickup head are received opposite to each other in the sealed body; the grasping assembly comprises two parallel grasping members and two elastic members substantially perpendicularly interconnecting the grasping members, thereby cooperatively forming a substantially rectangular shape, the grasping members are movable in the sealed body to grasp and release the workpieces.

2. The vacuum laminator of claim 1, wherein the grasping assembly further comprises two guide members positioned between the grasping members; each elastic member is received in each guide member.

3. The vacuum laminator of claim 2, wherein the grasping assembly further comprises two positioning members, each comprising a positioning surface contacting the workpiece.

4. The vacuum laminator of claim 1, further comprising a housing to which the alignment assembly is slidably connected.

5. The vacuum laminator of claim 4, wherein the sealed body comprises a main portion to which a cover plate is detachably connected.

6. The vacuum laminator of claim 5, further comprising a driving device fixed to the housing and connected to the main portion of the sealed body.

7. The vacuum laminator of claim 1, wherein each of the grasping members comprises a grasping portion and a sliding portion connected substantially perpendicular to the grasping portion.

8. A vacuum laminator for laminating workpieces, comprising:
   a grasping assembly grasping one workpiece;
   an alignment assembly connected to the grasping assembly adjusting a position of the workpiece on the grasping assembly;
   a pickup head picking up another workpiece; and
   a sealed body, wherein the grasping assembly and the pickup head are received opposite to each other in the sealed body;
   wherein the vacuum laminator further comprises at least one imaging unit opposite to the grasping assembly and capturing images of the workpieces on the grasping assembly and the pickup head to determine a position of the workpieces;
   wherein the grasping assembly comprises two parallel grasping members and two elastic members substantially perpendicularly interconnecting the grasping members, thereby cooperatively forming a substantially rectangular shape, and the grasping members are movable in the sealed body to grasp and release the workpieces.

9. The vacuum laminator of claim 8, wherein each of the at least one imaging units comprises a positioning plate, a plurality of frames and a plurality of imaging members; the imaging members are fixed on the frames and the frames are slidably connected to the positioning plate.

10. The vacuum laminator of claim 9, wherein each of the at least one imaging units further comprises a plurality of light sources fixed on the frame.

11. The vacuum laminator of claim 8, wherein each of the grasping members comprises a grasping portion and a sliding portion connected substantially perpendicular to the grasping portion.

12. The vacuum laminator of claim 8, wherein the grasping assembly further comprises two guide members positioned between the at least two grasping members; each elastic member is received in each guide member.

13. The vacuum laminator of claim 12, wherein the grasping assembly further comprises two positioning members each comprising a positioning surface contacting the workpiece.

14. The vacuum laminator of claim 8, further comprising a housing to which the alignment assembly is slidably connected.

15. The vacuum laminator of claim 14, wherein the sealed body comprises a main portion to which a cover plate is detachably connected.

16. The vacuum laminator of claim 15, further comprising a driving device fixed to the housing and connected to the main portion of the sealed body.

* * * * *